United States Patent [19]

Yamamoto

[11] Patent Number: 4,549,854
[45] Date of Patent: Oct. 29, 1985

[54] VACUUM GENERATING DEVICE

[75] Inventor: Shoii Yamamoto, Tokyo, Japan

[73] Assignee: Kabushiki Kaisha Myotoku, Tokyo, Japan

[21] Appl. No.: 599,998

[22] Filed: Apr. 13, 1984

[30] Foreign Application Priority Data

Apr. 15, 1983 [JP] Japan .............................. 58-56391[U]

[51] Int. Cl.[4] ................................................ F04F 5/48
[52] U.S. Cl. .................................... 417/187; 294/64.2
[58] Field of Search ............... 417/182, 186, 187, 188, 417/189; 248/362; 294/64.2, 64.3

[56] References Cited

U.S. PATENT DOCUMENTS

| 2,107,084 | 2/1938 | Pletcher | 417/187 |
| 2,934,086 | 4/1960 | Blatt | 294/64.2 |
| 2,987,007 | 6/1961 | Conkling | 417/189 |
| 4,089,622 | 5/1978 | Aubel et al. | 417/188 |
| 4,402,651 | 9/1983 | Ise | 417/182 |
| 4,432,701 | 2/1984 | Ise | 417/187 |

Primary Examiner—Edward K. Look
Attorney, Agent, or Firm—Murray Schaffer

[57] ABSTRACT

A vacuum generating and control device for use to grasp and move articles having an ejector pump utilizing compressed air from a compressor source. The device includes integrally built in means for beginning and stopping the vacuum suction.

3 Claims, 2 Drawing Figures

VACUUM GENERATING DEVICE

BACKGROUND OF THE INVENTION

The present invention relates to vacuum generating and control devices to be used to grasp and move articles and more particularly to a vacuum generating device for producing a vacuum an ejector pump utilizing compressed air from a compressor source, the device including integrally built in means for beginning and stopping the vacuum suction.

It has been known to use a suction pad or the like as the means for feeding, moving and extracting articles from bulk sources to the work station, in various automatic machines and labor saving devices. The vacuum range within the suction pad or the like is controlled through a vacuum pump. However, there is a disadvantage in that the vacuum pump is large and very costly.

Therefore, a gas ejector pump utilizing the compressor normally provided in the factory has come to be used. That is to say, the gas ejector pump propels a jet of compressed air toward a conical hole within a partition chamber, resulting in a severe drop of pressure within the partition chamber creating a negative pressure and consequently a vacuum within the suction pad connected to it. This operation has the effect that the vacuum can be provided cheaply and the device used can be made in a very small size.

However, in order to start and stop suction, the compressor must be controlled or a controlling valve or the like must be provided in the compressed air conduit from the compressor. Thus, the entire device is generally so complicated as not to be readily used or easily handled.

It is the object of the present invention to provide a vacuum generating device which uses a gas ejector pump fed from a convention line compressor providing a source of gas under pressure. It is a further object to provide means integral with the device for beginning and stopping the vacuum suction.

It is a further object of the present invention to provide a vacuum generating device which is compact, easy to handle, saves compressed air and is economical, to build and to use.

SUMMARY OF THE INVENTION

According to the present invention, a vacuum control device is provided comprising a body having any inlet port adapted for connection to a source of air under pressure and an outlet port for connection to a suction pad. A bore is formed in the body to receive air from the inlet port and a piston having an axial passage is located in the bore and defines with the bore an expansion chamber at its rear end and an expansion chamber at its front end. An air jet ejector is axially aligned with the front end of the bore being formed by a nozzle and an aspirator chamber surrounding the nozzle communicating with the outlet port. The piston has a seal packing at its forward tip and is movable between a first position wherein the tip is spaced from said nozle permitting said air under pressure to flow into said nozzle to create a vacuum in said aspirator chamber, and a second position wherein the seal packing seats against the rear end and of the nozzle to block the flow of air. The piston is operated by means which feeds air under pressure to a sectioned one of the front and rear chambers.

Preferably, the means for selectively moving the piston comprises a duct extending through said body from each of the front and rear chambers, and a central duct extending in part through the piston and in part through the body from the axial passage in the piston and a valve for switch air between the central duct to one or the other of the front and rear ducts.

Therefore, by switching the switching valve, the piston is moved forward and rearward by the compressed air pressure so as to open or close the rear end of the nozzle by seating or unseating the packing thereon, to thereby control the ejection of the air out of the nozzle creating or not creating a vacuum within the partition chamber. When the compressed air flowing through the nozzle is stopped and the pressure of the air in the piston's central passage is above a fixed valve, the compressor or source of air will automatically stop and the compressed air will be saved.

DESCRIPTION OF THE INVENTION

Figure 1:
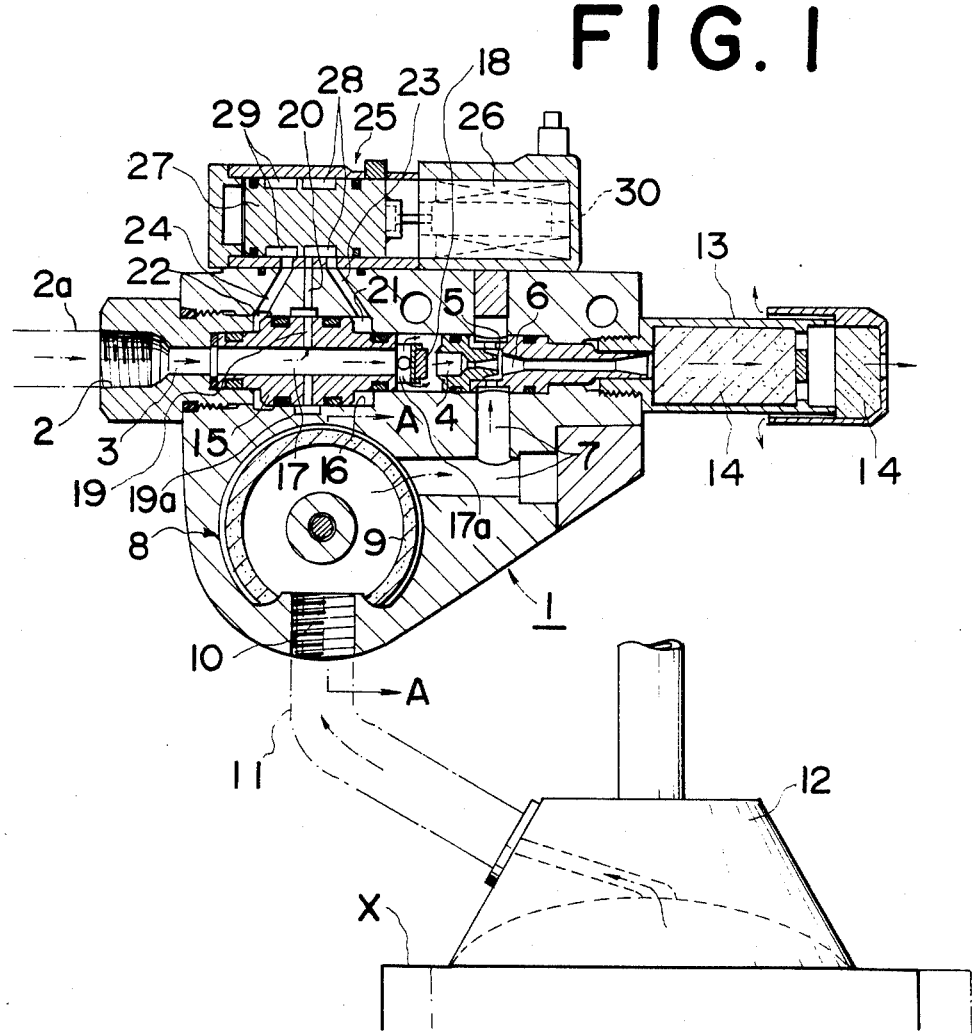
FIG. 1 is a longitudinal cross-section view of a vacuum generating device embodying the present invention.
Figure 2:
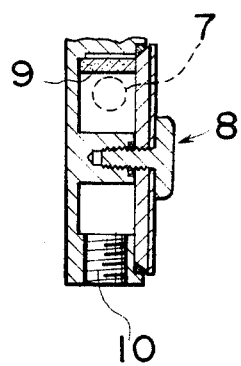
FIG. 2 is an enlarged view of a section of the device of FIG. 1 taken along line A—A in FIG. 1.

As seen in FIG. 1, the device comprises a housing body 1 provided at one end with a compressed air feed inlet 2 adapted to be connected to a hose 2a leading from a compressor (not illustrated) or another source of air under pressure. The inlet communicated with a bore 3 at the forward end of which is arranged a nozzle 4 surrounded by an aspirator chamber 5, terminating in a conically narrowing hole 6 through which the compressed air is exhausted. Radially extending from the partition chamber 5 is a suction hole 7 which extends, via an elbow 7a into a filter chamber 8.

The air filter chamber 8 is provided with an annular filter element 9 made of a sintered metal or the like so as to be arranged at a proper spacing from the wall of the filter chamber 8. An outlet port hole 10 communicates with the filter chamber 8 interiorally of the filter element 9 and is adapted to have a suction hose 11 attached to a suction pad 12, connected to it.

A muffler or silencer 13 loaded with conventional silencing material 14 such as air passing fibers is arranged on the outlet end of the conical hole 6 to silence the noises of the compressed gas exhaust.

A piston 15 is located in the bore 3 between the inlet port 2 and the rear end of the nozzle 4 so as to be reciprocalbe, forward and rearward, between the inlet 2 and the nozzle 4.

The piston 15 is formed with a reduced neck 16 at each end entering into the inlet 2 and the aspiration chamber 5 respectively sa as to be guided in its axial reciprocation and to define with the bore 3 spaces at its front and rear ends allowing such movement. Further, a compressed air passage 17 is provided through the center of the piston 15 so as to be aligned with the air feed inlet port 2. A radial set of holes 17a extends from the passage 17, about the forward end of the piston, so that air can pass into the nozzle 4. The front end of the piston, ahead of the holes 17a, is provided with an elastic seal packing 18 adapted to close the rear end of the nozzle 4 when the piston 15 moves forward, thus shutting off passage of air to the nozzle. The piston 15 is further provided substantially midway between its ends with diametric holes 19 communicating with an annular groove 19a in the housing body 1. The groove 19a is sufficiently wide to be in communication, at all times, with the diametric holes 19, no matter the position of the piston.

The housing body 1 is provided with a duct 20 communicating with the groove 19a and with ducts 23 and 24 communicating respectively with the spaces formed in the bore 3 by the reduced necks 16 of the piston 15 which spaces from a front chamber 21 and rear chamber 22 respectively. A switching valve, generally denoted by the numeral 25, is located on the body 1 and is adapted to selectively cause communication of the central duct 20 with either of the ducts 23 and 24.

In the embodiment shown in the drawings, the switching valve 25 is formed of a spool 27 moved by a plunger 30 of a solenoid 26. The spool is formed with an annular groove 28 which effects comunication between the central duct 20 and the duct 23 as shown in the drawing, and with an annular groove 29 which effects communication between the central duct 20 and the duct 24 upon reciprocation of the spool by operation of the solenoid 26 moving the spool 27 to the right.

In the state illustrated in FIG. 1, the suction pad 12 will suck an article to it. This is accomplished by feeding the compressed air through the hose 2a and bore 3 wherein a part of the compressed air is fed to the front chamber 21 through the communicating hole 19 of the piston 15, central duct 20 of the housing, annular groove 28 of the spool 27 and duct 23 maintaining the piston 15 in its rearmost position separating the packing 18 from the rear end of the nozzle 4. Therefore, the compressed air will be expelled in a jet through the nozzle 4, passing into the aspiration chamber 5 and out through conical exhaust hole 6. The pressure within the aspiration chamber 5 will become negative and the air within the suction pad 12 will be drawn through the suction hole 7 via the filter chamber 8 producing in the interior of the suction pad 12 a vacuum sufficient to suck the article X. Thereafter, by moving the suction pad 12, the article X can be freely conveyed.

To release the article X at a predetermined location, the solenoid 26 is electrified causing the spool 27 to be moved to the right (as seen in the drawing) by the coil 30. The annular groove 29 will thus make communication between the central through hole 20 and the through hole 24. As a result, the compressed air will be fed to the rear chamber 22 causing the piston 15 to be moved forwardly. On moving forward, the piston 15 causes the packing 18 at its tip to contact and close the rear end of the nozzle 4 consequently feeding of compressed air to the nozzle 4, the aspiration chamber 5 and outwardly of conical exhaust hole 6 will be interrupted. No air is thus pulled through the holes 7 and the interior of the suction pad 12 will be freed of vacuum releasing it to atmosphere. Therefore, the suction pad 12 will be automatically separated from the article X. The filter chamber 8 as well as passage 7 and aspiration chamber 5 will be open to atmosphere.

As described in detail in the above, the present invention produces such effects that the vacuum can be begun and stopped quickly, the integrally formed device is very easy to handle and is compact, the conventionally and readily available compressor system in any factory can be utilized as it is and also the amount of compressed air is reduced at great savings.

I claim:

1. A vacuum control device comprising a body having an inlet port adapted for connection to a source of air under pressure and an outlet port for connection to a suction pad, a bore formed in said body receiving air from said inlet port, a piston located in said bore and having a central through passage for said air, said piston and said bore defining an expansion chamber at the rear end and an expansion chamber at the front end of said bore, an air jet ejector axially aligned with the front end of said bore comprising a nozzle and an aspirator chamber surrounding said nozzle, and duct means for communication of said aspirator chamber with said outlet port, said piston having a seal at its forward tip and being movable between a first position wherein said tip is spaced from said nozzle permitting said air under pressure to flow into said nozzle to create a vacuum in said aspirator chamber, and a second position wherein said seal seats against the rear end and of said nozzle to block the flow of air under pressure to said nozzle, and means for selectively feeding air under pressure to the front and rear chambers to move said piston into one or the other of said first and second positions.

2. The device according to claim 1 wherein said means for selectively moving said piston between said first an second positions comprises duct means extending through said body from each of said front and rear chambers central duct means extending in part through said piston and in part through said body from said central passage and switching valve means for connecting said central duct means to one or the other of said front and rear ducts.

3. The device according to claim 2 wherein said switching value means comprises a spool valve movable to cause communication between said central duct means and a selected one of said duct means extending from said front and rear chambers, and a solenoid for moving said spool.

* * * * *

UNITED STATES PATENT AND TRADEMARK OFFICE
CERTIFICATE OF CORRECTION

PATENT NO. : 4,549,854
DATED : October 29, 1985
INVENTOR(S) : Yoji ISE

It is certified that error appears in the above-identified patent and that said Letters Patent are hereby corrected as shown below:

On the cover sheet [75] the name of the Inventor should read --Yoji Ise, Tokyo, Japan--

The heading of the cover page, under United States Patent should read --Ise--

Signed and Sealed this

Twenty-first Day of January 1986

[SEAL]

Attest:

Attesting Officer

DONALD J. QUIGG

Commissioner of Patents and Trademarks